UNITED STATES PATENT OFFICE.

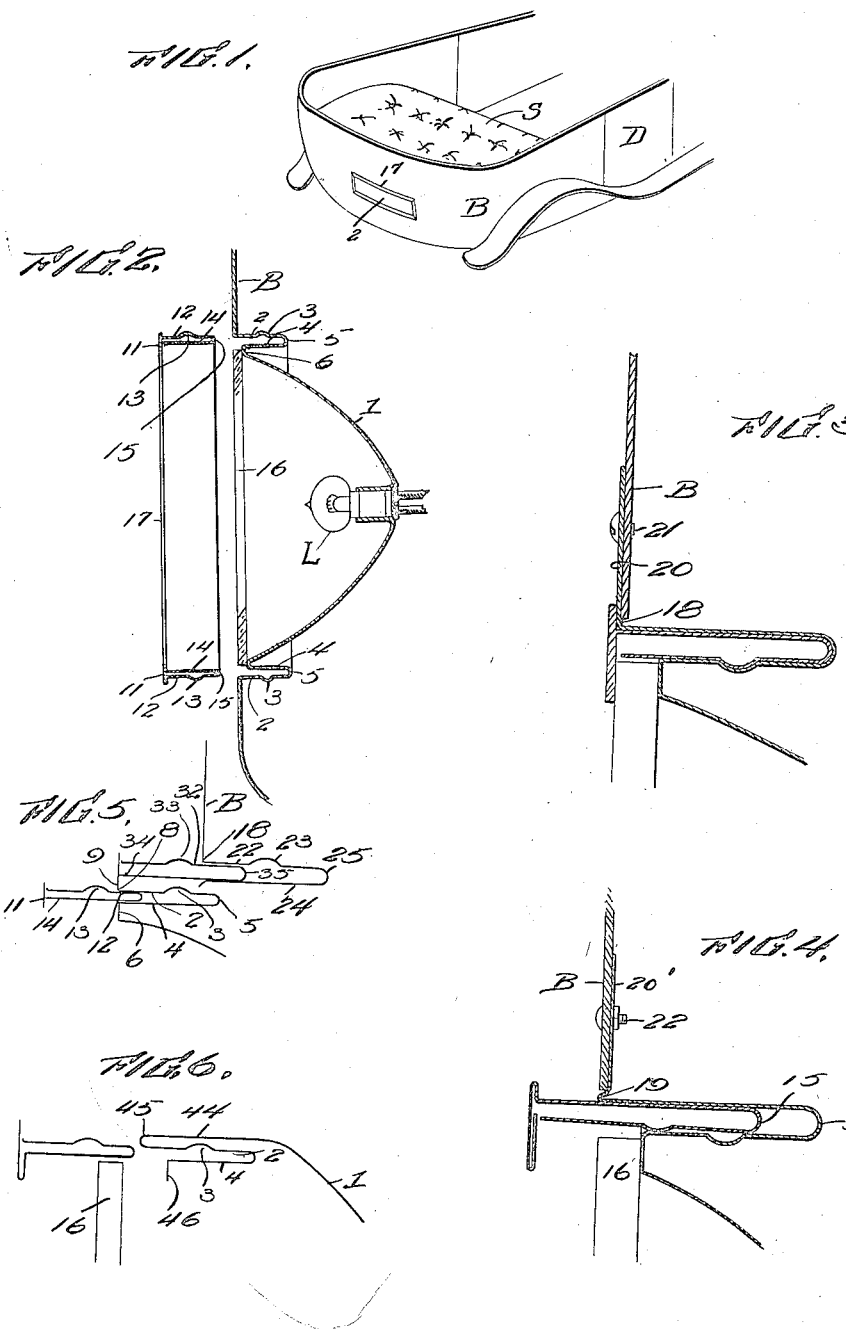

ARNOLD G. PETERS, OF MINNEAPOLIS, MINNESOTA.

LAMP-BOX.

1,214,363.  Specification of Letters Patent.  Patented Jan. 30, 1917.

Application filed February 29, 1916.  Serial No. 81,172.

*To all whom it may concern:*

Be it known that I, ARNOLD G. PETERS, a citizen of the United States, residing at Minneapolis, in the county of Hennepin and State of Minnesota, have invented certain new and useful Improvements in Lamp-Boxes; and I do hereby declare the following to be a full, clear, and exact description of the invention, such as will enable others skilled in the art to which it appertains to make and use the same.

This invention relates to illumination, and especially to projectors of the dashboard type; and more particularly the present invention is a lamp box comprising a body let into a substantially upright sheet (such as the dashboard or the rear wall of an automobile) and either forming a part of or secured to said sheet, a front which is usually a glass pane or lens, and means for fastening the front in place to close the otherwise open mouth of the lamp body.

One object of the present invention is to produce a lamp box which will form an integral, or at least a practically permanent part of an upright sheet of metal such as the dashboard or the rear metal panel of an automobile body, whereby the lamp will be housed behind the plane of the dash or within the body under its rear seat so that it is not subjected to accident, is easily cleaned, and will not rattle.

With these and other objects in view, the invention consists in a lamp of this general character whereof several types are described in the following specification and shown in the accompanying drawings in which—

Figure 1 is a perspective view of the rear portion of an automobile body with a lamp of rectangular contour let into the upright metallic panel or sheet of which it is composed. Fig. 2 is an enlarged vertical section through said sheet and lamp box, with the glass front in place over the latter and the male fastening member or frame slightly removed. Fig. 3 is a sectional detail of the upper portion of a similar lamp box whose body is let into a hole in a metal sheet from the outside, and Fig. 4 a similar section where the body stands opposite a hole in the metal sheet but its flange is secured to the inside of such sheet. Fig. 5 is a section similar to Figs. 3 and 4 excepting that the sheet around its hole and the flange around the lamp body carry detachable fastening devices such as will be explained herein. Fig. 6 is a similar section of a lamp body provided with the female portion of the fastening device, a frame slightly removed therefrom and constituting the male portion of said fastening device, and the glass front between these two portions or members; but the lamp box or body in this illustration is designed to have an extraneous support or means for attaching it to the body of the vehicle.

Broadly speaking, my present invention proposes to inset the body of a lamp box into an upright metal wall or sheet, such as the dashboard or the rear panel of an automobile.

For purposes of illustration I refer to Fig. 1 wherein B designates the automobile body showing a rear door D and seat S, and the invention takes the form of a tail light which may well be disposed at about the point shown. While the invention could be inset into the dash of an automobile, street car, or the like, I consider no further illustration necessary. I do not wish to be limited to any particular form of lamp box, and that shown—and in several instances only diagrammatically shown—is made up of a body designated throughout the several views by the numeral 1 and herein illustrated as constituting the reflector, a front which is mostly or wholly of glass and is designated throughout the several views by the numeral 16, and the fastening device for holding this front in place over the open mouth of the body, which fastening device as best seen in Figs. 2 and 6 includes a frame designated broadly by the numeral 17. While this frame may be hinged or otherwise suitably connected to the body, I prefer to attach it thereto by the means set forth below. The light designated by the letter L in Fig. 2 may be of any appropriate type, forming no part of the present invention. As shown herein, this light stands at the center of the reflector or body 1, which latter is of metal, and a feature of the present invention lies in the means for insetting this metal body within a hole in and forming it as part of or attaching it to the sheet lettered B and which constitutes a part of the vehicle body itself.

One embodiment of my invention is shown in Fig. 2. Here a sheet of metal B constituting part of the automobile body is stamped so as to inset the body 1 of the lamp box (in the shape shown or in any appropriate shape), and the connection between these two elements is by means of an open channel which forms the female member of the fastening device yet to be described. This channel comprises an outer wall 2 standing at right angles to the sheet B and provided with an outstanding rib forming a groove 3, an inner wall 4 preferably flat and a little narrower than the outer wall to which it is united by a bend 5 at the bottom of the channel, said walls standing practically parallel, and a shoulder 6 at the front edge of the inner wall and uniting it with the periphery of the body 1, said shoulder standing preferably parallel with the plane of the sheet B but to the rear of the same as shown. The contour of this channel member uniting the sheet and body is not important. It may be round or oval, or it might be oblong as seen in Fig. 1—depending on the shape it is desired that the finished lamp shall possess. It is not always important that the groove 3 be in the outer wall, as Figs. 3 and 4 show this groove in the inner wall instead. In what might be called the simplest form of my invention, this channeled member is stamped integral with the sheet B and the body 1, and the union is reliable and water-proof, and the parts will never rattle. This leaves the mouth of the body 1 open, and for closing the same any suitable front lamp-member may be used, as the glass pane or lens 16. This is laid against the shoulder 6, and held in position by any suitable means. The means by preference employed is a frame made of a sheet metal strip bent into substantially U-form and of proper size and dimensions to pass into the channel. That is to say, it has an outer wall 12 with a rib 13 adapted to enter the groove 3, and a flat inner wall 14 united to the inner edge of the outer wall by a bend 15 adapted to lie in the bend 5 when the rib enters the groove; and to the front edge of one wall, preferably the inner, is secured a cross strip or beading 11 of suitable fanciful design. This beading is part of the frame designated by the numeral 17 in Fig. 1, and it overlies the open outer edge of the male member of the fastening device so as to prevent the entrance of water and mud thereinto. It is not essential that the beading be secured to the inner wall, although I prefer it for reasons which will appear. In assembling the parts of this lamp, the front or glass 16 is laid against the shoulder 6, and then the male member of the fastening device is inserted into the female or channeled member until its rib 13 snaps into the groove 3, and all parts are locked together. The light L may then be illuminated from a suitable source of energy as will be clear, and it is now protected against the entry of water or dirt into the lamp. When it is desired to gain access to the interior of the body 1, as for replacing the bulb of an electric light, a thin tool is inserted over the proper edge of the beading 11 (which would be the outer edge in Fig. 2 or the inner edge in Fig. 3) and that wall which carries the rib 13 is pressed toward the opposite wall until the rib disengages or partly disengages the groove 3; then the entire frame or male member is pried out of the channel or female member, and the glass 16 falls off into the hand.

The types of my invention shown in Figs. 3 and 4 differ from that already described in that the metallic sheet forming part of the vehicle body and the metallic sheet from which are stamped the lamp body 1 and the female member of the fastening, are not integral. In these views the body or sheet B will be provided with a hole at a point where it is desired that the lamp shall be inset into such body, and the lamp body 1 and said female member may be formed in the same way as above described, excepting that the outer wall of said female or channeled member is bent at a right angle as at 18, possibly with a crimp as shown at 19, and then carried radially outward in a flange 20. This flange may be wide or narrow, and it may be ornamental if desired. In Fig. 3 it overlies the body wall B which necessitates that the lamp body be inserted from the outside, and in Fig. 4 the flange 20' underlies the body wall B which necessitates that the lamp body 1 shall be inserted from the inside. The crimp 19 may well be provided where this flange 20' joins the material of which the balance of the structure is made, and the inside flange will probably not be ornamental. Any suitable means may be employed for connecting the flange with the sheet. In Fig. 3 screws 21 are shown, and in Fig. 4 bolts 22 are shown. The former are applied from the exterior, and the nuts of the latter from the interior. I do not wish to be limited in this respect. The front of the lamp is shown in both these views as glass 16, held in place by the fastening device already described excepting that I have made use of these views to show that the groove 3 and rib 13 may be in the inner walls of the members of said fastening device. However, this is a matter of choice in any type of my invention. My principal reason for suggesting that the vehicle body and lamp body may sometimes be made from two sheets of metal and united later by either permanent or separable fastening means, is because it may not always be found practical to stamp both elements from a single sheet without cracking or breaking the latter. Indeed, it is quite possible that the lamp body may be made of much lighter stock or even different metal than that from which the vehicle body is made.

Another type of my invention is illustrated in Fig. 5. Herein the lamp body 1 is surrounded by a female or channeled member bearing the same numerals 2, 3, 4, 5 and 6 for the same parts as shown in Fig. 2, but the outer edge of the outer wall 2 is bent outwardly at 8 into a flange 9. Into this outwardly channeled or female member fits the male member bearing the same numerals 11, 12, 13, 14 and 15 as in Fig. 2, for holding the glass, and the description of this much need not be repeated. The body sheet B is here bent at a right angle 18 into an outer wall 22 having a groove 23, and this wall is bent at 25 into a flat inner wall 24. From the flange 9 there projects inward a flat wall 34, bent at its inner edge at 35 into an outer wall 32 having a rib 33. Thus is produced a female member around the opening in the body B, and a male member secured to the flange 9 and disposed outside the female member of the lamp body. The result of this construction is that when the lamp body is pushed into the opening in the sheet, its male member bearing numerals 32 to 35 passes into the female member bearing numerals 22 to 25, and the rib 33 engages the groove 23 when the bends 25 and 35 come in contact. Thereafter the male member of the fastening device for the front or glass can be pushed into the female member to fasten these parts together in the manner already described. The difference between this type of my invention and those hitherto described is that the fastening means between the lamp body and automobile body is the same that is elsewhere used between the lamp body and its front, and therefore the lamp body can be taken out of the sheet B in the same manner.

The type of my invention illustrated in Fig. 6 embodies the same devices for holding the glass front removably in the open mouth of the lamp body, but the latter is intended to be supported by extraneous means from the sheet or within a hole in it, and as such means form no part of the present invention they are not illustrated. Their use, however, avoids the necessity for provision of devices around the front edge of the lamp body by means of which it may be connected to the sheet, and therefore this view shows said front edge as carried over or around the outer wall of the female member as at 44, and united by a bend 45 with the front edge of said wall—the bend being rather an open one so that there is sufficient space between the walls 2 and 44 for the rib which forms the groove 3 to move. The shoulder 46 for the glass 16 is herein shown as bent at right angles from the front edge of the inner wall 4. The male member of the fastening device may be the same as above described, and the rib and groove in either wall as suggested.

Thus it will be seen that I have produced a lamp box which is preferably always inset into a metal sheet and held therein either by being integral therewith or by the use of fastening means. These I would make of a permanent nature as it is generally not necessary to remove the lamp box, but I have shown at Fig. 5 how my improved fastening device may be employed for this purpose. In any event the open mouth of the cupped lamp body is closed by a removable front, the same made up of the glass and a surrounding frame, and such frame constitutes the male member of the fastening device. When the male and female members are engaged, the bend of the former is pressed into the open mouth of the latter, and the rib 13 on the free wall of the male member (whether that be the outer or inner wall) causes this wall to be sprung toward the flat wall as is permissible by the resiliency within the bend 15. When this rib reaches a point opposite the groove 3, said resiliency causes the free wall to spring outward and the rib and groove are engaged just at a time when the beading 11 comes into place against the sheet B or a flange and also against the outer face of the glass 16. In the entry of the ribbed wall as described, it is quite possible that the grooved wall of the female member (whether it be the outer or the inner wall thereof) may also be sprung slightly away from the flat wall, and this is especially true where the female member is stamped from thinner metal than that of which the sheet B may be made. In this connection I suggest that it may be wise to use different metals for the members of the fastening device, so that they cannot rust together, and it may be wise to use such metals or such treatment thereof between the parts of the lamp and automobile body as will also prevent their rusting together. I have not thought it necessary to show any frame permanently surrounding the glass, and the latter is designated only as a pane although obviously it could be a lens, and it might be provided with an extra sheet or other means for dimming the light, or it might be provided with letters or numbers so that it becomes a signal. Attention is directed to the fact that the mouth of the channel opens axially, or on a line parallel with the axis of the lamp, and when the male member is inserted into this channel it is moved axially.

I am aware that it is old to hinge the lamp front so that it may swing into closed position, and it is possible to provide threads or bayonet joint elements so that the front-frame and body of a round lamp may be connected by a rotary movement of one with respect to the other. It will be obvious, however, that when the movement is axial, I am not confined to a lamp which is round in contour because no relative rotary movement of parts is necessary.

What I claim is:

1. A lamp box whose rear portion comprises a projector, a surrounding channel, and a shoulder between them, all formed as an integral part of a sheet metal vehicle body; and whose front portion includes a glass whose edge rests on said shoulder, and a frame removably fitting said channel and holding the glass in place against the shoulder and across said projector.

2. In a lamp box, the combination with a cupped body, and a glass-holding frame; of fastening means between said elements comprising a female member on one of them consisting of a channel opening axially and having one wall smooth and the other irregular, and a male member on the other element shaped for removable insertion into said female member and having an irregularity adapted to engage that of such female member for holding the members engaged.

3. A sheet metal lamp box comprising a cupped body and around its mouth a channel composed of an inner wall united to the body by a shoulder and an outer wall united at its rear edge to said inner wall and with its front edge projecting beyond said shoulder, one of the walls having a groove facing toward the other; combined with a glass resting against the shoulder, and a frame surrounding the glass and removably engaging said channel, the frame being composed of a resilient metal strip bent into U-shape cross section and of a size to fit said channel closely, one wall thereof having a rib adapted to enter said groove, and a beading secured across the front edge of the inner wall of the frame.

4. A lamp box comprising a cupped body whose mouth is surrounded by an axially open channel and a shoulder inside the same, a glass closing said mouth and resting against the shoulder, and a frame removably engaging said channel and overlying the edge of said glass and bearing it against said shoulder.

5. A lamp box comprising a cupped body whose mouth is surrounded by an axially open channel and a shoulder inside the same, a glass closing said mouth and resting against the shoulder, and a frame removably engaging said channel and having a beading across its front edge overlying and closing the mouth of the channel and bearing the glass against said shoulder.

6. A sheet metal lamp box comprising a cupped body and around its mouth a channel composed of an inner wall united to the body by a shoulder and an outer wall united at its rear edge to said inner wall and with its front edge projecting beyond said shoulder; combined with a glass resting against the shoulder, and a frame surrounding the glass and removably engaging said channel.

7. A sheet metal lamp box comprising a cupped body and around its mouth a channel composed of an inner wall united to the body by a shoulder and an outer wall united at its rear edge to said inner wall and with its front edge projecting beyond said shoulder; combined with a glass resting against the shoulder, and a frame surrounding the glass and removably engaging said channel, the frame being composed of sheet metal inner and outer walls united by a bend, and a beading at the front edge of one of said walls.

8. A sheet metal lamp box comprising a cupped body and around its mouth a channel composed of an inner wall united to the body by a shoulder and an outer wall united at its rear edge to said inner wall and with its front edge projecting beyond said shoulder; combined with a glass resting against the shoulder, and a frame surrounding the glass and removably engaging said channel, the frame being composed of a resilient metal strip bent into U-shape cross section and of a size to fit said channel closely, and a beading secured across the front edge of the inner wall of the frame.

9. In a lamp box, a cupped body of sheet metal formed around its mouth with a channel composed of inner and outer substantially parallel walls united at their rear edges by a bend, and one of the walls having a groove facing toward the other; combined with a glass-holding frame composed of a sheet metal strip bent into U-shape cross section and of a size to fit said channel, one wall thereof having a rib adapted to enter said groove.

10. In a lamp box, a cupped body of sheet metal formed around its mouth with a channel composed of inner and outer substantially parallel walls united at their rear edges by a bend, and the outer wall having a groove facing toward the other; combined with a glass-holding frame composed of a sheet metal strip formed into substantially parallel outer and inner walls united by a bend, a rib on the outer wall adapted to engage said groove when the bends are in contact, and a beading at the front edge of the inner wall.

11. A lamp box whose rear portion comprises a projector and a surrounding channel, both formed as an integral part of a sheet metal vehicle body; and whose front portion includes a glass, and a frame removably fitting said channel and holding the glass in place.

12. In a lamp box, the combination with a projector, a surrounding channel consisting of an inner wall, a shoulder integrally uniting its front edge with the edge of said projector, an outer wall wider than the inner wall, and a bend uniting the rear edges of said walls, and a metal vehicle wall connected with the front edge of said outer wall; of a frame of a size and depth to fit said channel, means for holding it removably therein, and a beading at the front edge of the frame, for the purpose set forth.

13. The combination with a sheet forming part of the wall of a vehicle body, a cupped lamp body pressed into said sheet, and an axially opening channel also pressed into the sheet around the mouth of the lamp body; of a lamp front, a frame therefor of a size and shape to enter said channel axially of the lamp, and means for holding it removably therein.

14. The combination with a member having an opening with a shoulder around it, and an axially opening channel around the shoulder; of a glass across the opening and resting against the shoulder, a frame of a size and shape to enter said channel, means for holding it removably therein, and means on the frame for holding the glass against the shoulder.

In testimony whereof I affix my signature in presence of two witnesses.

ARNOLD G. PETERS.

Witnesses:
L. O. RUE,
LOIS JOHNSON.